United States Patent
Zisman et al.

(10) Patent No.: US 11,457,053 B2
(45) Date of Patent: Sep. 27, 2022

(54) METHOD AND SYSTEM FOR TRANSMITTING VIDEO

(71) Applicant: Strigy Media Ltd., Herzliya (IL)

(72) Inventors: Guy Zisman, Ramat Gan (IL); Amir Segev, Rannana (IL)

(73) Assignee: DAZN MEDIA ISRAEL LTD., Tel Aviv (IL)

(*) Notice: Subject to any disclaimer, the term of this patent is extended or adjusted under 35 U.S.C. 154(b) by 58 days.

(21) Appl. No.: 16/795,619

(22) Filed: Feb. 20, 2020

(65) Prior Publication Data

US 2020/0267199 A1 Aug. 20, 2020

Related U.S. Application Data

(60) Provisional application No. 62/866,149, filed on Jun. 25, 2019, provisional application No. 62/807,933, filed on Feb. 20, 2019.

(51) Int. Cl.
| | |
|---|---|
| *G06F 15/16* | (2006.01) |
| *H04L 65/70* | (2022.01) |
| *H04N 21/4402* | (2011.01) |
| *H04N 21/462* | (2011.01) |
| *H04N 21/845* | (2011.01) |

(52) U.S. Cl.
CPC ......... *H04L 65/70* (2022.05); *H04N 21/4402* (2013.01); *H04N 21/4621* (2013.01); *H04N 21/8456* (2013.01)

(58) Field of Classification Search
CPC .............. H04L 65/607; H04N 21/4402; H04N 21/4621; H04N 21/8456
USPC ......................................................... 709/219
See application file for complete search history.

(56) References Cited

U.S. PATENT DOCUMENTS

| | | | |
|---|---|---|---|
| 9,721,393 B1* | 8/2017 | Dunn | G09G 5/005 |
| 10,601,889 B1* | 3/2020 | Doron | H04L 65/605 |
| 2012/0212579 A1* | 8/2012 | Frojdh | H04N 13/161 348/43 |
| 2015/0229695 A1* | 8/2015 | Kim | H04N 21/4384 709/219 |
| 2018/0190327 A1* | 7/2018 | Coward | H04N 21/21805 |
| 2020/0177928 A1* | 6/2020 | Shin | H04N 21/440245 |
| 2020/0244942 A1* | 7/2020 | Maze | H04N 21/2353 |
| 2021/0321149 A1* | 10/2021 | Tan | H04N 21/234363 |

* cited by examiner

*Primary Examiner* — Imad Hussain
(74) *Attorney, Agent, or Firm* — Browdy and Neimark, PLLC (57) ABSTRACT

A computerized method for transmitting one or more video streams, the method may include receiving at least one input video stream that comprises visual information obtained from multiple fields of view that differ from each other; converting the at least one input video stream to a group of encoded independent self-contained video streams (EIS-CVSs), by performing a codec-agnostic process; wherein different EISCVSs comprise visual information from different spatial segments of the at least one input video stream; receiving a first request to receive video information related to a first direction related to a first user; generating a first video stream that comprises a first sub-set of EISCVSs that is related to the first direction; and
sending the first video stream to a device of the first user, over a first communication link that has a first bandwidth that is lower than a bandwidth required to convey the input video stream.

19 Claims, 7 Drawing Sheets

METHOD AND SYSTEM FOR TRANSMITTING VIDEO

CROSS REFERENCE

This application claims priority from U.S. provisional patent 62/807,933 filing date Feb. 20, 2019.

This application claims priority from U.S. provisional patent 62/866,149 filing date Jun. 25, 2019.

Both provisional patents are incorporated herein by reference.

BACKGROUND OF THE INVENTION

Wireless and wired brute force provision of ultra high quality real time video streams to end user devices (such as but not limited to head mounted virtual reality devices, TVs and mobile devices) is not feasible in existing networks.

Social viewing of the high quality real time video streams by different users is even more problematic as it requires synchronization across the set of users.

There is a growing need to provide systems, method and computer medium products for providing high quality real time video streams to end user devices—especially in the context of social viewing.

SUMMARY

There may be provided a system, a non-transitory computer readable medium and a method. The method may be a computerized method for transmitting one or more video streams. The method may include receiving at least one input video stream that comprises visual information obtained from multiple fields of view that differ from each other; converting the at least one input video stream to a group of encoded independent self-contained video streams (EISCVSs), by performing a codec-agnostic process; wherein different EISCVSs comprise visual information from different spatial segments of the at least one input video stream; receiving a first request to receive video information related to a first direction related to a first user; generating a first video stream that comprises a first sub-set of EISCVSs that is related to the first direction; and sending the first video stream to a device of the first user, over a first communication link that has a first bandwidth that is lower than a bandwidth required to convey the input video stream.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

DETAILED DESCRIPTION OF THE DRAWINGS

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

Because the illustrated embodiments of the present invention may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

There may be provided a system, a method, and a non-transitory computer program product for the provision of high quality real time video streams to end user devices (head mounted virtual reality devices, TVs and mobile devices)—especially in the context of social viewing.

High quality video streams means single, or multiple concurrent streams accumulating to, but not limited to, 8K UHD at 60-120 frames per second at rates of 30-120 megabits per second.

Real time video stream means that every frame captured on the camera side is transmitted and consumed on the end user device in a reasonable latency (a few seconds) in a continuous manner, i.e. streamed.

Social viewing means allowing different users (even those located at different locations) to simultaneously view the same event—even from different points of view to the event.

The provision of the high quality real time video stream may be greatly simplified when using a codec-agnostic tiling (slice based tiling).

For example—using a slice based codec that does not have built-in (native, declared as part of the standard) tiling capabilities (that are both limited to a specific tiling requirements), that are much more efficient (in power consumption) than tiling specific codec and can be executed with simpler hardware. The slice base codec operated on one slice after the other.

For example—the method allows using a H264 instead of H265. The former is more energy efficient than the latter by a factor of at least 10.

Figure 1:
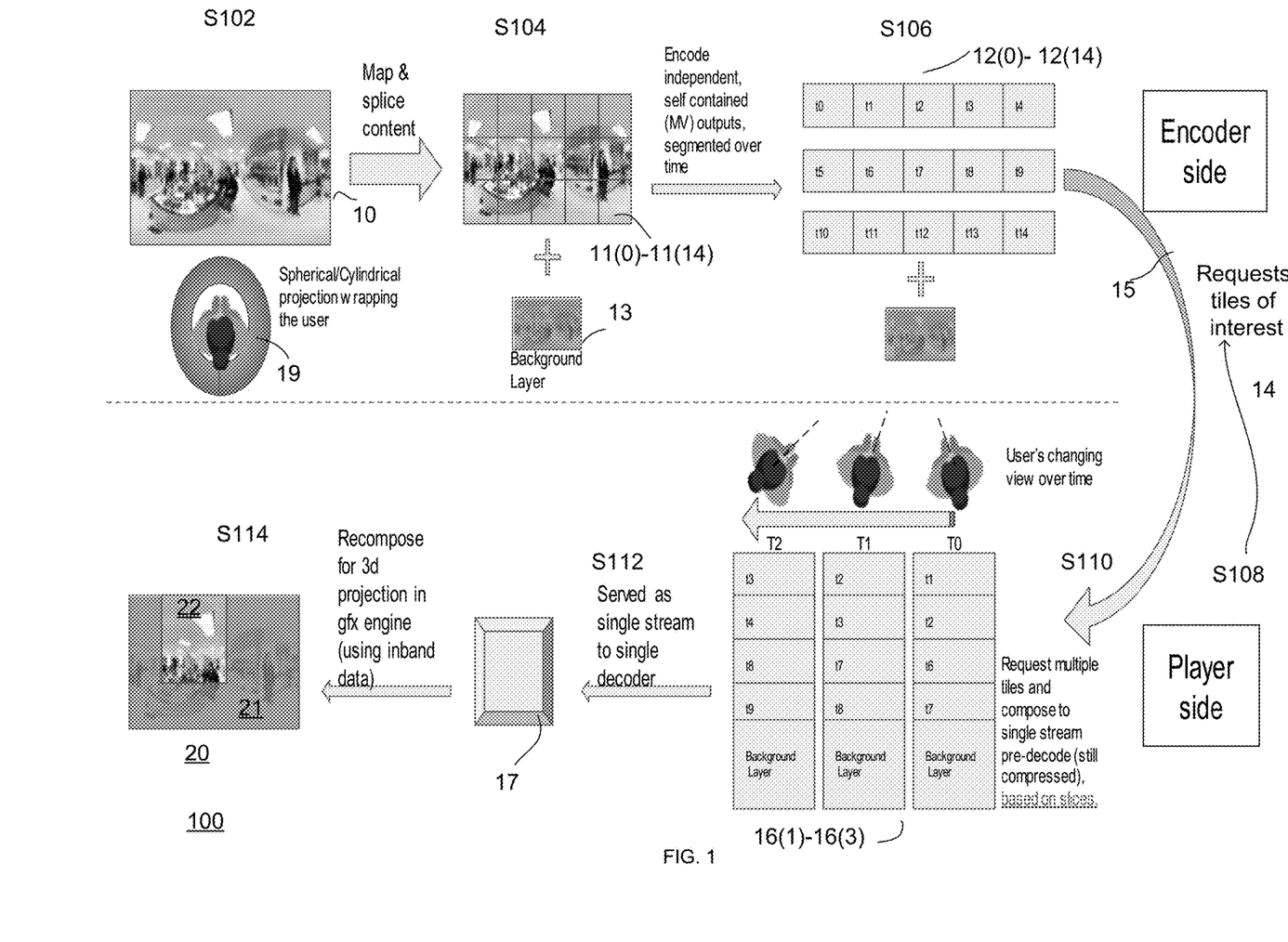
FIG. 1 illustrates an example of a method.

FIG. 1 illustrates method 100, the method includes (for each eye):

a. Receiving an input video stream (for example input video stream 10) that may be a standard-rectangular/spherical/cylindrical projection video stream (that "covers" the entire possible directions of gaze of the user—and may surround the user) of an event. S102 b. Converting the input video stream to several lower quality video streams (background streams) 13. S104.

c. Converting the input video stream to multiple encoded independent self-contained video streams (tiles)—wherein each tile "covers" (coverage illustrates by segments 110(0-11(14)), a segment of the field of view of the video stream (FoV, in the case of virtual reality headset it is the region currently being viewed, or the area being viewed on screen for rectangular devices such as TV and mobile device). The tiles may be of the same shape and/or size, but at least one tile may differ from another tile by shape and/or size. FIG. 1 illustrates fifteen tiles t0-t14 12(1)-12(14). This is done at the encoder side—probably in the network. The encode independent self-contained video streams may be of a certain duration (for example half a second). S106. The number of tiles may differ from fifteen. A tile may of the same size and/or shape as another tile—but may be of a different size and/or shape.

d. The end user device may request (14), at a certain point of time, a subset of tiles—that corresponds to the field of view of the user (the field of view is based, at least in part, on the direction of gaze of the user) or their explicit interactive preference or any other system logic decision. For the case of virtual reality headset: In FIG. 1, at point of time T0 the user looks to the mid-left and thus the virtual reality device will request tiles t1, t2, t6 and t7. In FIG. 1, at point of time T1 the user looks to the mid-right and thus the virtual reality device will request tiles t2, t3, t7 and t8. In FIG. 1, at point of time T2 the user looks to the right and thus the virtual reality device will request tiles t1, t2, t8 and t9. S108.

e. The encoder sends (15) to the user device the relevant tiles and the selected background stream (in accordance with user's network conditions)—16(1), 16(2) and 16(3) respectively. All may be compressed. The encoder sends metadata that identifies the relevant tiles and the background stream—so that all relevant tiles and the background stream can be packaged together on the elementary stream level and be decoded by a single decoder. S110 f. The packaged composited selection of tiles sent to the decoder can be comprised by tiles originated from a single input stream or can be a combination of several input sources simultaneously, thus the user may consume tiles representing more than one input source at the same moment.

g. The relevant tiles and the background stream may be included in a certain video stream (17) that is sent to a decoder of the user device. S112.

h. The certain video stream is decoded to provide a decoded video stream 20 that includes the decoded versions of the tiles (22)—whereas rest of the video stream includes the parts of the background stream (21) not covered by the tiles. S114

The method may be applied to the provision of multiple streams to multiple user devices simultaneously—thus steps S108, S110, S112, and S114 may be executed in parallel and independently—each user may receive the tiles relevant to the user.

The partition to tiles and then the sending the tiles of interest to each user device greatly simplifies the process and allows to support multiple user devices that may view the event at different points of views (different directions) and/or a combination of points of view at the same time.

Figure 2:
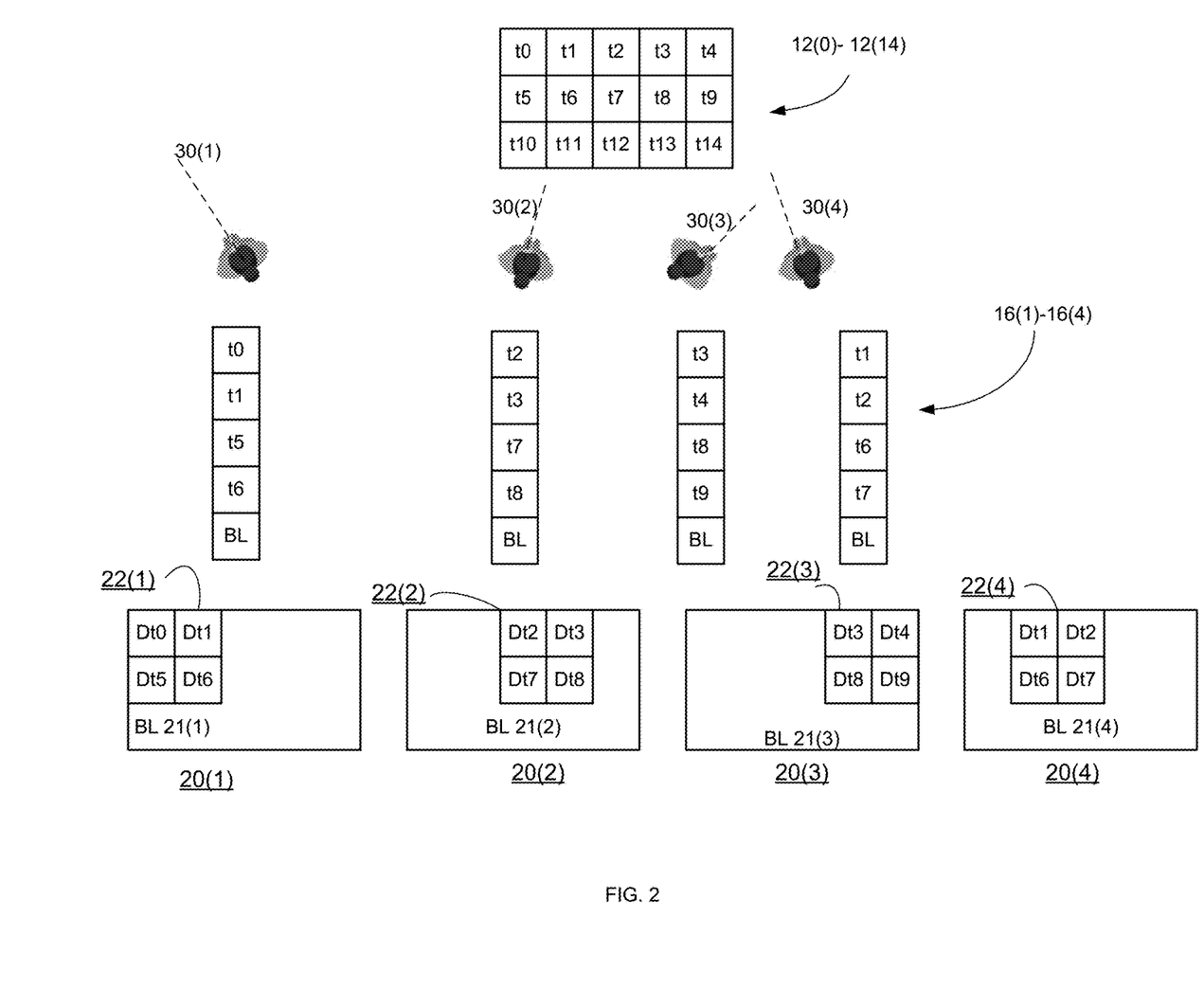
FIG. 2 illustrates an example different tiles.

FIG. 2 illustrates a point in time during which four users look at different tiles- and receive at the same time different streams (20(1)-20(4)) that include different combinations of tiles (22(1)-22(4)) and parts of background layer (21(1)-21(4)). FIG. 2 also illustrates the streams displayed on the different user devices.

The method may split the generation and processing of video streams between the server/cloud and the user devices.

Alternatively—the generation and processing of the video streams may be performed without substantial involvement of the user device.

Multi-GoP for efficient streams switching (GoP-group of pictures).

There may be provided a method that may generate different quality (and thus size) representations of video streams.

A user may switch between different quality levels each predefined period.

The quality of the required video stream viewed by the user may change much faster than the each few seconds—for example in the case of virtual reality headset as a result of a change in the direction of gaze of the use—thereby a relevant tile may become irrelevant and vise verse.

Thus—when a user changes its selection of input streams or changes the point of view to a new direction of gaze (in the case of a virtual reality headset) he may view a part of the background level video stream. This may also result in the case of zooming in into a certain spatial region of the stream for any type of display.

In order to allow a user to change the quality and/or selection of tiles at a higher frequency there may be provided multiple time-shifted encoded independent self-contained video streams (time shifted tiles) that correspond to the same part of the field of view. The user device, immediately after a change in a direction of gaze may jump to the closets time shifted version of the new tiles of interest.

Figure 3:
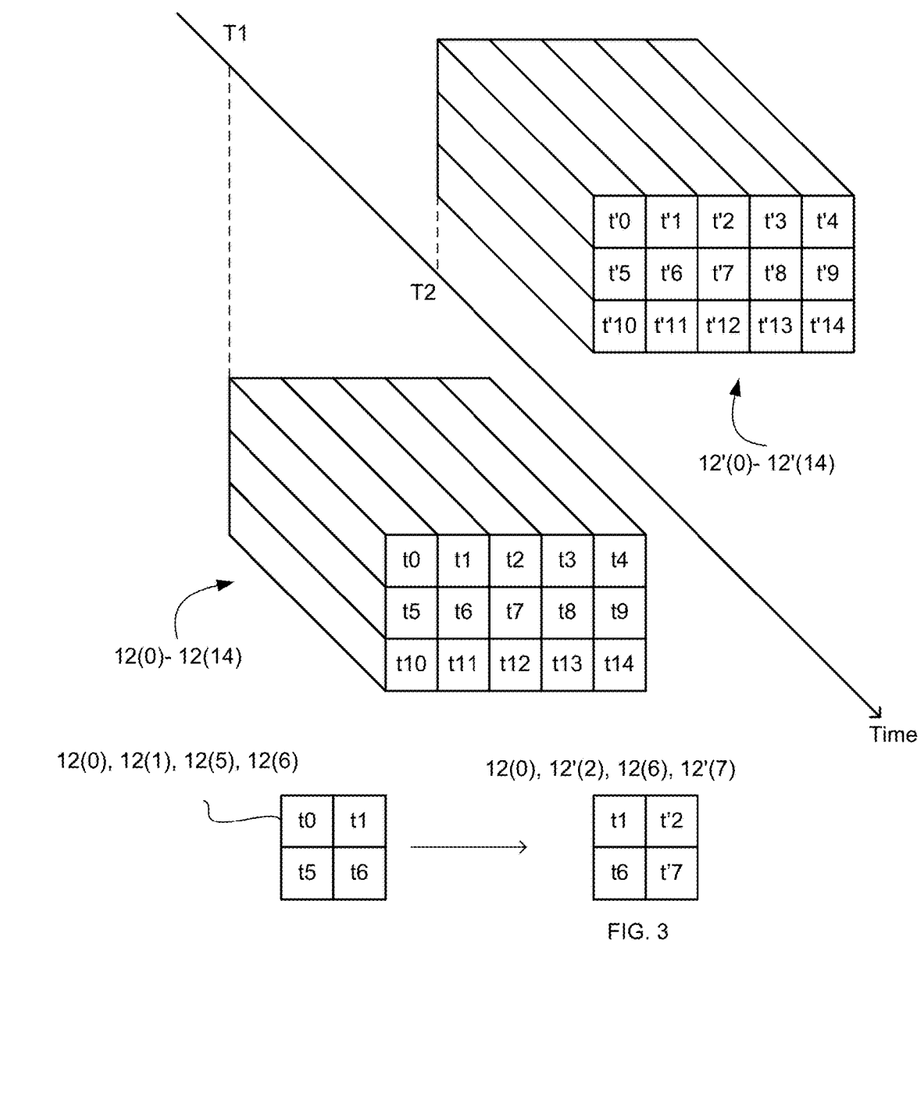
FIG. 3 illustrates an example of multiple tiles and multiple time-shifted tiles.

FIG. 3 illustrates tiles t0-t14 12(0)-12(14) and a time-shifted version t'0-t'14 12'(0)-12'(14). A user that started viewing tiles t0, t1, t5 and t6 (12(0), 12(1), 12(5), 12(6)) and changes his direction of gaze to view t1, t6, t2 and t7—may still receive t1 and t6 but a time-shift version of t'2 and t'7 (12(1), 12'(2), 12(6), 12'(7)).

Multi-view coding MVC—(encoding using redundancy in stereoscopic video). MVC is supported in various codec.

For the case of stereoscopic video stream for virtual reality headset but not limited to, the method may include mapping each left view frame to even frames and every right view frame one to uneven one. This multiplies the frame per second rate but may allow a decoder to use inter-frame compression to compress the right and left frames. After the frame is decoded the decoded frames are reassigned to the left and right streams. Timing information of the images may be amended.

Figure 4:
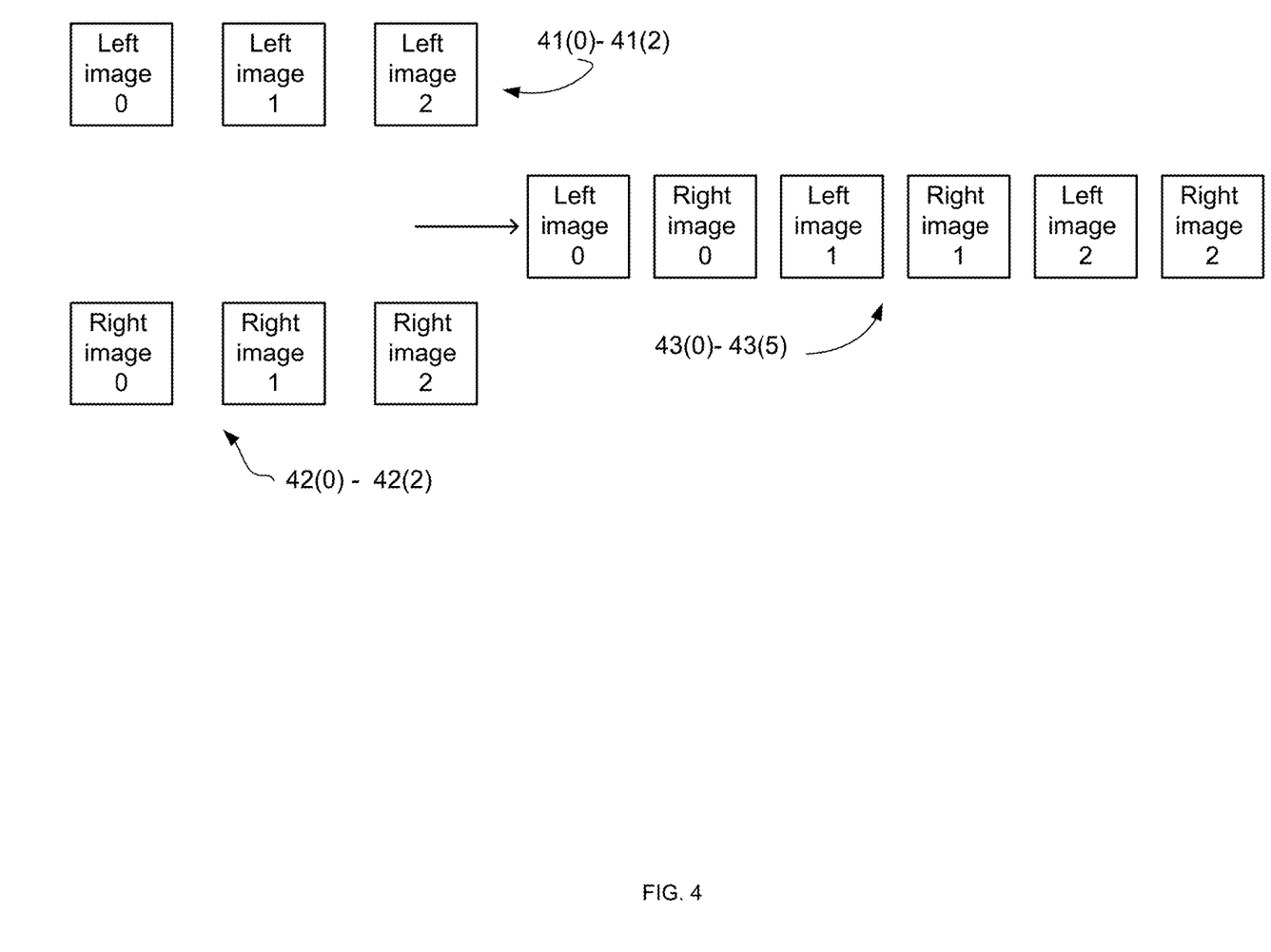
FIG. 4 illustrates an example of multiple tiles.

This is illustrated in FIG. 4.

The processing may be executed during the generation of the tiles, or at any other stage.

This may include generating a stream that has same resolution but doubled frame rate. Even numbered frames are taken from the left view and the odd-numbered frames are taken from the right view respectively. To exploit inter-view redundancy you need set the number of reference frames to be 2 or greater. Nothing more is required. For example, if your bandwidth is 10 Mbps then quality provided by each view is significantly greater than that obtained by 5 Mbps (as in Simulcast case), the quality of each view can correspond to 6 Mbps or even 7 Mbps (due to exploitation of inter-view redundancy).

An example of an Inter-View Redundancy Coding

Given the overall bandwidth B Mbps

1. Get two high-quality streams or raw video corresponding to two views (left and right)

2. Encode each stream separately with target bitrate B/2 (in VBR mode).

a. Decode each stream and store decoded YUV-sequences b. Compute quality of each decoded YUV-sequence with a metric (e.g. with SSIM), we need the average score over all frames and the minimal score. So, each encoded stream is associated with the two scores—the average and the minimum.

3. Build a new YUV-sequence by the temporal packing.

a. Encode the new YUV with the target bitrate B b. Decode the stream to a YUV-sequence, build two YUV-sequences corresponding to left (even-numbered frames) and right views (odd-numbered frames).

c. For left and right view YUV-sequences compute two scores the average and the minimal.

Compare Scores from 2(a) and 2(b). i expect the scores from 3(c) (temporal packing) are greater than those in 3(b) (Simulcast).

ROI encoding based on viewership data

The user device may send viewing information about the popularity of streams selection or direction of gaze of a user over time (in the case of virtual reality headset), even generate viewing patterns of a user in a near future and concentrating the decoding efforts on the expected fields of view. If there are multiple users then a pattern that may reflect the distribution of gaze directions of the multiple users per time. The pattern may represent that expected number of viewers that are expected to view a certain tile per point in time.

The generation of tiles may be based on the estimated viewing pattern. For example—inferring from the content the trajectories of features (faces, certain objects) over time and let it guide decision making of the tiling layout and generation (spatial quality/bitrate distribution) automatically in real time. For example—the encoder may generate time shift versions and/or different quality representations of tiles based on the viewing pattern. For example—in tiles that are not interesting the system may generate a mono stream. More time shifted versions and/or more quality versions may be generated for tiles that are expected to be viewed by more users and/or for longer time periods.

Figure 5:
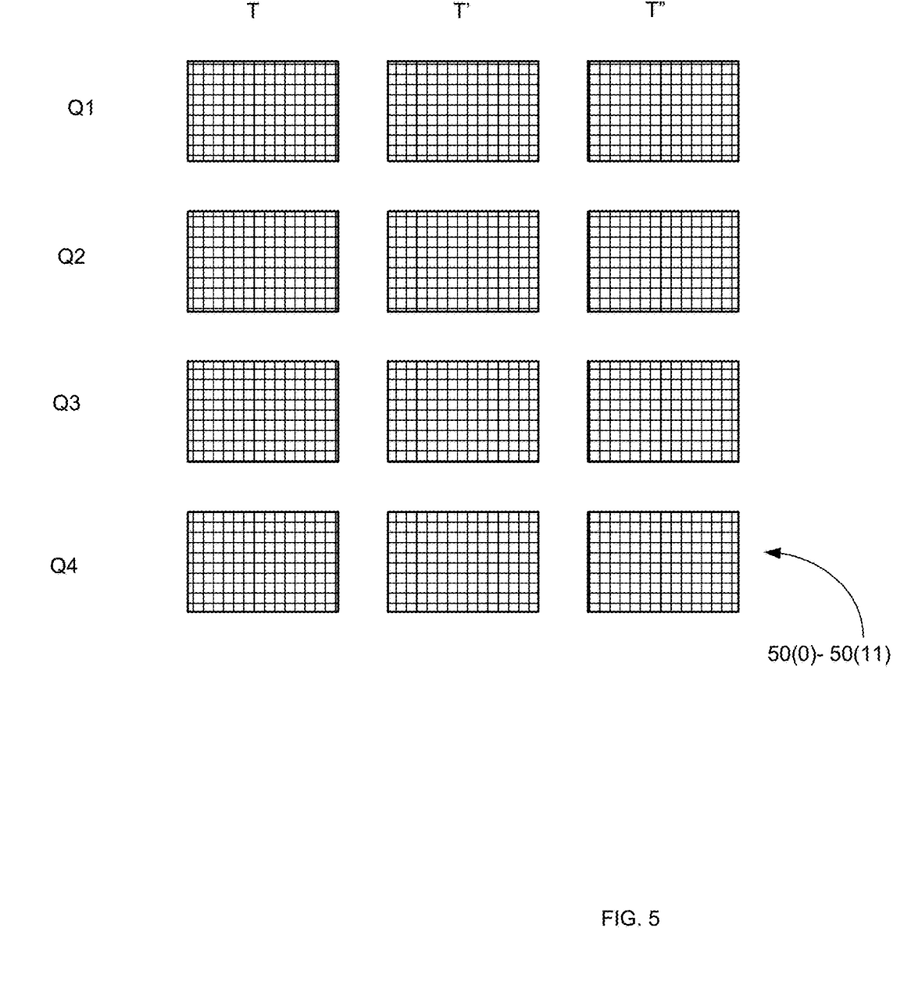
FIG. 5 illustrates an example of multiple streams.

For example—FIG. 5 illustrates twelve versions of tiles-four quality levels Q1, Q2, Q3 and Q4 and three time shifted—whereas when a certain part of the image is not expected to be viewed then only some of these twelve versions may be generated.

In Band Data

In band data may be used to pair content data (the video) with additional metadata in a robust manner that may withstand compression, encryption, transport mechanisms, or any other transformative lossy operations. For this, such data may be coded on the pixel/uncompressed domain (as opposed to the compressed domain) in the form of, but not restricted to, color coding combination.

In band data may be included in the video stream—each tile—may include in-band data located at a predefined spatial location in the tile. For example—in the bottom line of the tile. That data may describe the location of the tile within the field of view, global spatial coordinates, arbitrary indexing or any other representation of data. This is read by the graphic image processor—information represented by various combinations of colors of pixels. The in band data may include fields such as Sequence Parameter Set (SPS) and the Picture Parameter Set (PPS) of H264.

This in band data allows the end user's device to identify every specific tile post decoding, even post the tiles packaging stage that occurs pre decoding, Thus allowing the end user device to remap the tiles location in user's space (in case of virtual reality headset), or to execute any transformative operation which is tile-identity based.

Continuous volumetric video transmission through discrete representation

Volumetric video transmission include generating from streams acquired by different cameras located at different locations a 3D model (cloud of points) and then deciding which point of view to transmit (even a point of view that was not actually acquired by a camera).

The method may include receiving volumetric information and allowing the user to skip between virtual cameras—and sending him tiles related to the point of view. The change of view from one virtual camera to the other may be done at the same manner of replacing one tile by the other.

Figure 6:
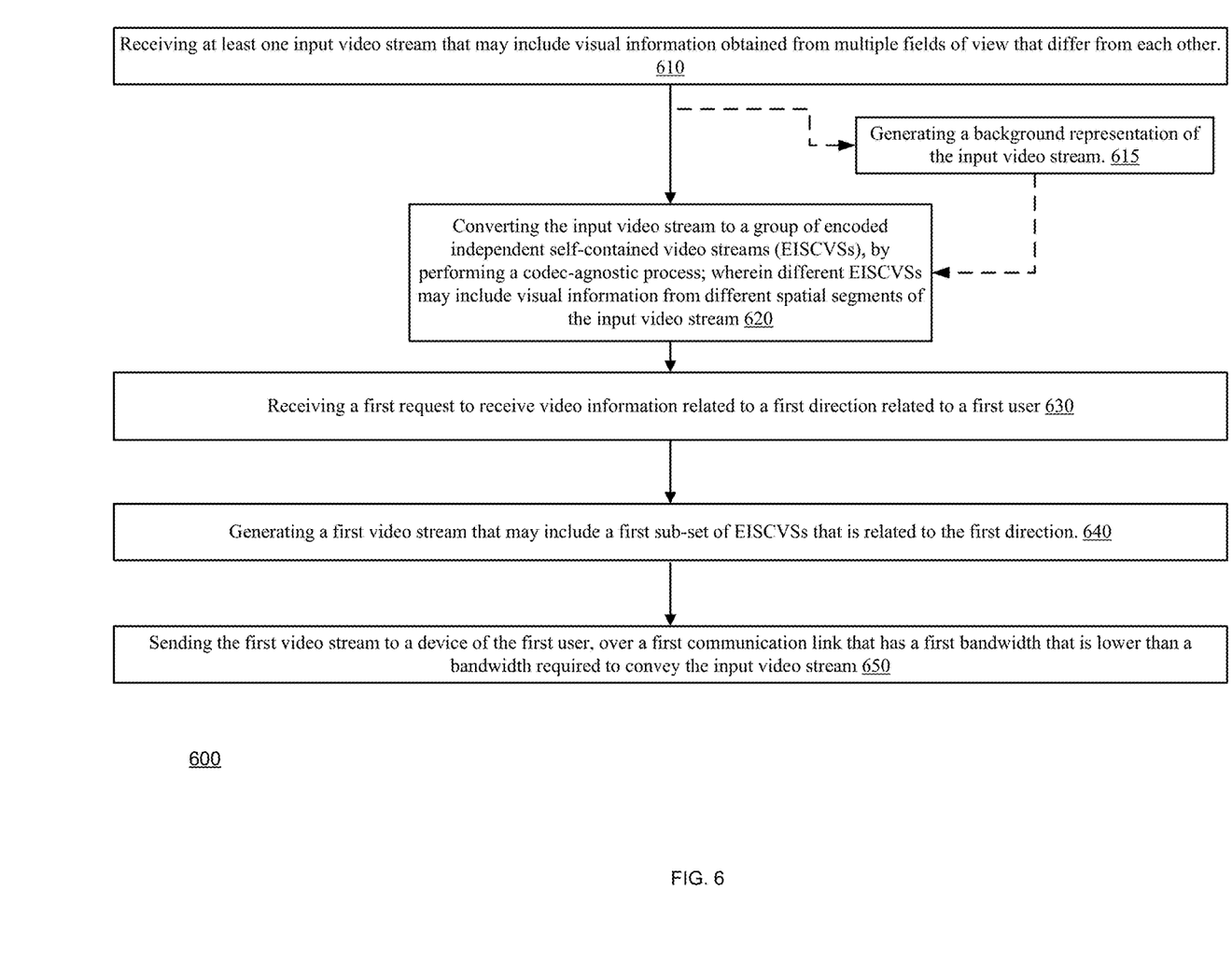
FIG. 6 illustrates an example of a method.

FIG. 6 illustrates a computerized method 600 for transmitting one or more video streams.

Method 600 may start by step 610 of receiving at least one input video stream that may include visual information obtained from multiple fields of view that differ from each other.

The at least one input video stream may be a single input video stream and that the method may include generating a plurality of video streams to a plurality of user—for example to allow concurrent viewing of a single event from one or more different directions.

Step 610 may be followed by step 620 of converting the input video stream to a group of encoded independent self-contained (including, but not restricted to, constrained motion vectors) video streams (EISCVSs), by performing a codec-agnostic process; wherein different EISCVSs may include visual information from different spatial segments of the input video stream.

Step 610 may also be followed by step 615 of generating a background representation of the input video stream. The background representation of the input video stream may have a lower quality that the quality of the EISCVSs. The overall size of the background representation may be of an order of a size of a single EISCVS.

Steps 615 and 620 may be followed by step 630 of receiving a first request to receive video information related to a first direction related to a first user.

The first direction can be explicitly requested by the user (for example—may be selected), can be determined by the user device, can be a direction of gaze or any other arbitrary direction.

Step 630 may be followed by step 640 of generating a first video stream that may include a first sub-set of EISCVSs that is related to the first direction.

The first video stream may be a high quality real time video streams.

Step 640 may include generating the first video stream to include at least a first part of the background representation (in addition to the first sub-set of EISCVSs).

Step 640 may include generating the first video stream to include a slice that includes (a) the EISCVSs of the first sub-set, and (b) the first part of the background representation.

Step 640 may be followed by step 650 of sending the first video stream to a device of the first user, over a first communication link that has a first bandwidth that is lower than a bandwidth required to convey the input video stream.

The first video stream may include stereoscopic information, non-stereoscopic information, and may include additional content (in addition to the first sub-set of EISCVSs). Non-limiting example of the additional content may include at least a part of a background representation of the at least one input video stream, a video blog, textual information, information, one-to-many content stream.

The first video of a certain duration (for example a fraction of a second, one or few seconds, more than five seconds, and the like). Thus, steps 630, 640 and 650 may be repeated multiple times. Between one repetition to the other the direction related to the client may change and steps 630, 640 and 650 change accordingly.

As indicated above, in order to allow a user to change the quality at a higher frequency there may be provided multiple time-shifted encoded independent self-contained video streams (time shifted tiles) that correspond to the same part of the field of view. The user device, immediately after a change in a direction of gaze or selection of streams may jump to the closets time shifted version of the new tiles of interest.

Accordingly—step 640 may include generating the first video stream to include multiple time-shifted EISCVSs.

The change of direction may involve receiving, during step 630, a first additional request to receive video information related to a first additional gaze direction of the first user.

There is an overlap area between a spatial coverage of the first video stream and a spatial coverage of the first additional video stream. For example, referring to FIG. 3, the first sub-set of EISCVSs includes tiles t0,t1,t5 and t6, and a first additional sub-set of EISCVSs includes overlapping tiles t1 and t6 that represent the overlap area. Tiles t1 and t6 in appear both in the first sub-set of EISCVSs and in the first additional sub-set of EISCVSs).

Step 630 will be followed by step 640 of generating a first additional video stream that comprises a first additional sub-set of EISCVSs that is related to the first additional gaze direction.

Within the first additional sub-set of EISCVSs, EISCVSs (such as tiles t1 and t6) of the first additional stream that are related to the overlap area start at first point of time (this is a point in time related to the input video stream).

Within the first additional sub-set of EISCVSs, EISCVSs that are not related to the overlap area (for example t'2 and t'7) are time shifted—they start at second point in time (this is a point in time related to the input video stream) that differs from the first point of time.

In order to effectively cope with direction changes (especially provide high quality video swiftly following a change)—the method may support multiple time-shifted encoded independent self-contained video streams (time shifted tiles) that correspond to the same part of the field of view. The user device, immediately after a change in a direction of gaze or selection may jump to the closets time shifted version of the new tiles of interest.

The user device may be a virtual reality device, a stereoscopic display device, a television, a smartphone, and the like.

The first video stream can be further processed by the user device (for example by performing decoding and/or encoding) to provide a stream that can be displayed by the user. Alternatively, the first video stream may be displayed without further decoding or encoding.

Figure 7:
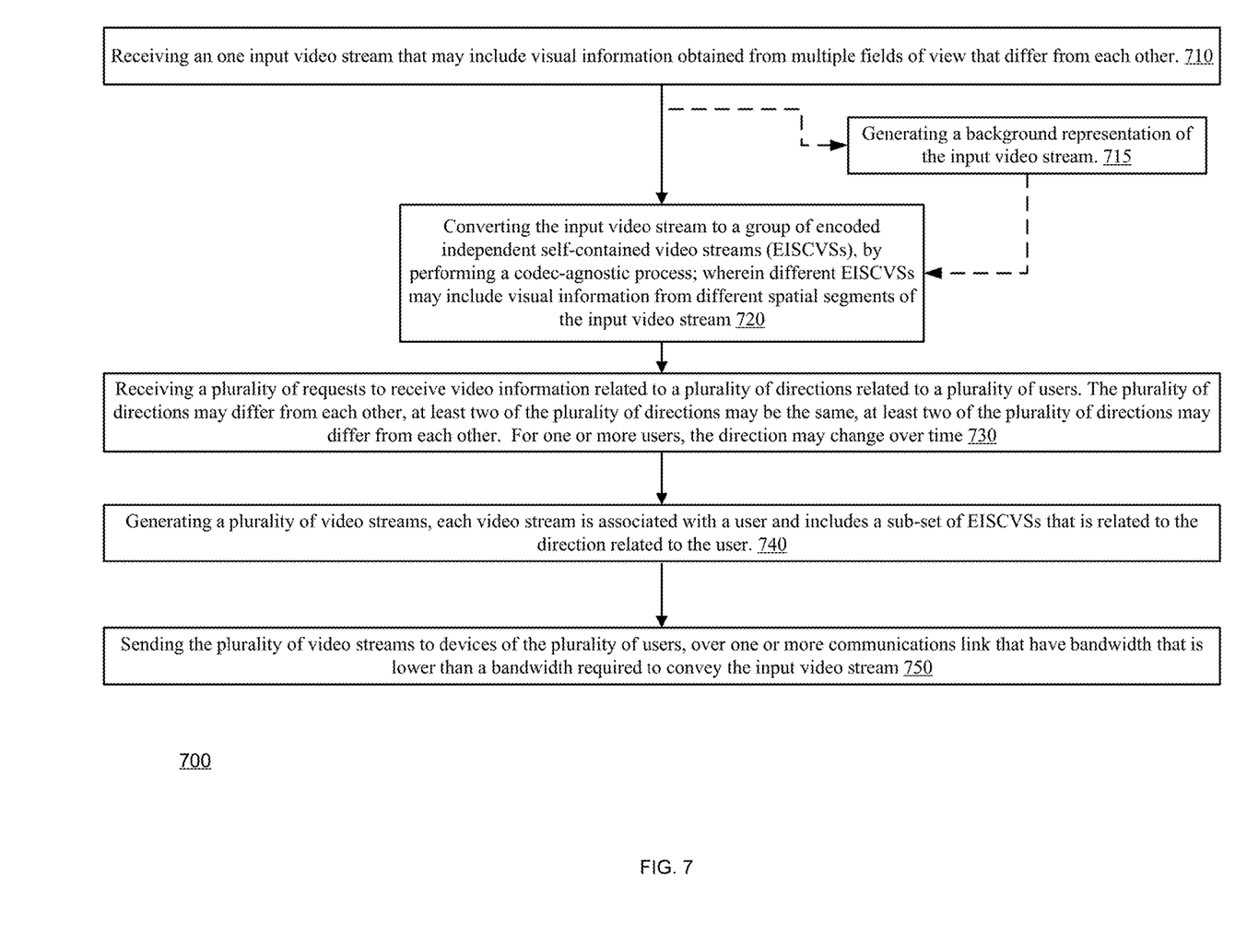
FIG. 7 illustrates an example of a method.

FIG. 7 illustrates a computerized method 700 for transmitting one or more video streams.

Method 700 may start by step 710 of receiving an input video stream that may include visual information obtained from multiple fields of view that differ from each other.

Steps 710 may be followed by step 720 of converting the input video stream to a group of encoded independent self-contained video streams (EISCVSs), by performing a codec-agnostic process; wherein different EISCVSs may include visual information from different spatial segments of the input video stream.

Step 710 may also be followed by step 715 of generating a background representation of the input video stream. The background representation of the input video stream may have a lower quality that the quality of the EISCVSs. The overall size of the background representation may be of an order of a size of a single EISCVS.

Steps 715 and 720 may be followed by step 730 of receiving a plurality of requests to receive video information related to a plurality of directions related to a plurality of users. The plurality of directions may differ from each other, at least two of the plurality of directions may be the same, at least two of the plurality of directions may differ from each other. For one or more users, the direction may change over time.

Each direction can be explicitly requested by the user, can be determined by the user device, can be a direction of gaze or any other arbitrary direction. Any reference to a direction may be applied mutatis mutandis to a combination of different angle of view and a location from which the view is taken.

Step 730 may be followed by step 740 of generating a plurality of video streams, each video stream is associated with a user and includes a sub-set of EISCVSs that is related to the direction related to the user.

Step 740 may include generating the plurality of video streams to include at least a part of the background representation (in addition to the first sub-set of EISCVSs). Different video streams may include different parts of the background representation, the same part of the background representation, the entire background representation, and the like.

Step 740 may include generating each video stream to include a slice that includes (a) the EISCVSs of a sub-set, and (b) at part of the background representation.

Each one of the plurality of video streams has a certain duration (for example a fraction of a second, one or few seconds, more than five seconds, and the like). Thus, steps 730, 740 and 750 may be repeated multiple times. Between one repetition to the other the direction related to the client may change and steps 730, 740 and 750 change accordingly.

As indicated above, in order to allow a user to change the quality at a higher frequency there may be provided multiple time-shifted encoded independent self-contained video streams (time shifted tiles) that correspond to the same part of the field of view. The user device, immediately after a change in a direction of gaze may jump to the closets time shifted version of the new tiles of interest.

Accordingly—step 740 may include generating a video stream to include multiple time-shifted EISCVSs.

Step 740 may be followed by step 750 of sending the plurality of video streams to devices of the plurality of users, over one or more communications link that have bandwidth that is lower than a bandwidth required to convey the input video stream.

The plurality of video streams may be sent over one or more (for example up to a plurality of) communication links.

The plurality of requests may include a first request and a second request—or more than two requests.

For example—the plurality of requests may include (a) a first request related to a first direction related to a first user, and (b) a second request to receive video information related to a second direction related to a second user.

In this case, step 740 may include (a) generating a first video stream that may include a first sub-set of EISCVSs that is related to the first direction, and (b) generating a second video stream that may include a second sub-set of EISCVSs that is related to the second direction.

In this case, step 750 may include (a) sending the first video stream to a device of the first user, over a first communication link that has a first bandwidth that is lower than a bandwidth required to convey the input video stream, and (b) sending the second video stream to a device of the second user, over a second communication link that has a second bandwidth that is lower than a bandwidth required to convey the input video stream.

Each one of method 600 and 700 may include performing (for example during step 620 or 720) multi-view coding (inter-view redundancy coding). This may include map each left view frame to even frames and every right view frame one to uneven one (or vice-verse). After the frame is decoded the decoded frames are reassigned to the left and right streams. Timing information of the images may be amended. The decoding may be executed during the generation of the EISSCVs, or at any other stage. This may include generating a stream has same resolution but doubled frame rate. Even numbered frames are taken from the left view and the odd-numbered frames are taken from the right view respectively.

Each one of method 600 and 700 may include performing ROI encoding based on viewership data.

Any one of method 600 and 700 may be applied on one or more input video streams. Any subset of EISCVSs may include EISCVSs that originate from a single input video stream or from different input video streams.

Any one of method 600 and 700 may be include concurrently outputting multiple video streams to a user.

Any one of method 600 and 700 may be applied on one or more directions related to a user. A subset of EISCVSs that is sent to a user (within one or more video streams) may include at least two EISCVSs that are related to different directions.

In the foregoing specification, the invention has been described with reference to specific examples of embodiments of the invention. It will, however, be evident that various modifications and changes may be made therein without departing from the broader spirit and scope of the invention as set forth in the appended claims.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures may be implemented which achieve the same functionality.

Any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. Alternatively, the examples may be implemented as any number of separate integrated circuits or separate devices interconnected with each other in a suitable manner. The integrated circuit may be a system on chip, a general-purpose processor, a signal processor, an FPGA, a neural network integrated circuit, and the like.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed is:

1. A computerized method for transmitting one or more video streams, comprising:
receiving at least one input video stream that comprises visual information obtained from multiple fields of view that differ from each other;
converting the at least one input video stream to a group of encoded independent self-contained video streams (EISCVSs), by performing a codec-agnostic process; wherein some EISCVSs comprise visual information from different spatial segments of the at least one input video stream; and wherein two or more EISCVSs comprise visual information from same spatial segments but are time shifted from each other by a time shift that is shorter than a duration of each one of the two or more EISCVSs;
receiving a first request to receive video information related to a first direction related to a first user;
generating a first video stream that comprises a first sub-set of EISCVSs, that is related to the first direction; and sending the first video stream to a device of the first user, over a first communication link that has a first bandwidth that is lower than a bandwidth required to convey the input video stream;
wherein the method further comprises:
receiving or generating one or more viewing patterns of one or more users; and
determining a number of encoded independent self-contained video streams (EISCVSs) per the spatial segments of the at least one input video stream by (a) generating at least EISCVSs that are time shifted from each other and at least two other EISCVSs that differ from each other by resolution to a spatial segment that has a first popularity, and (b) generating a single EISCVS for another spatial segment that has a lower popularity than the first popularity.

2. The method according to claim 1 comprising:
receiving a second request to receive video information related to a second direction related to a second user;
generating a second video stream that comprises a second sub-set of EISCVSs that is related to the second direction; and
sending the second video stream to a device of the second user, over a second communication link that has a second bandwidth that is lower than a bandwidth required to convey the input video stream.

3. The method according to claim 2 wherein the first direction is one out of (a) a first gaze direction of the first user, and (b) is requested by the user.

4. The method according to claim 2 comprising generating a background representation of the at least one input video stream.

5. The method according to claim 4 wherein the first video stream further comprises at least a first part of the background representation; and wherein the second video stream further comprises at least a second part of the background representation.

6. The method according to claim 5 wherein the first video stream comprises a slice that comprises (a) the EISCVSs of the first sub-set, and (b) the first part of the background representation.

7. The method according to claim 5 comprising concurrently (i) sending the first video stream to the device of the first user, and (ii) sending the second video stream to the device of the second user.

8. The method according to claim 1 wherein the multiple fields of view cover a rectangular, spherical or cylindrical region.

9. The method according to claim 1 comprising receiving or generating a pattern of first user direction requests and wherein the generating of the first video stream is responsive to the pattern.

10. The method according to claim 1, wherein the first video stream is a stereoscopic video stream that comprises interleaving image frames from a first left video stream and from a first right video stream.

11. The method according to claim 1 comprising:
receiving a first additional request to receive video information related to a first additional gaze direction of the first user;
generating a first additional video stream that comprises a first additional sub-set of EISCVSs that is related to the first additional gaze direction;
wherein there is an overlap area between a spatial coverage of the first video stream and a spatial coverage of the first additional video stream;
wherein EISCVSs of the first additional stream that are related to the overlap area start at a first input video stream point of time; and
wherein EISCVSs of the first additional stream that are not related to the overlap start at area span along a second period of time that is time shifted to the first period of time.

12. The method according to claim 1 wherein the at least one input video stream is multiple input video streams and wherein the generating of the first video stream is executed by an edge device.

13. The method according to claim 12 wherein the generating of the first video stream comprises including, in the first video stream, at least one requested content stream that differs from the first sub-set of EISCVS.

14. The method according to claim 13 wherein the at least one requested content stream comprises a video blog or another one-to-many streams.

15. The method according to claim 1 wherein at least two EISCVSs of the first sub-set of EISCVSs originated from different input streams of the at least one input stream.

16. The method according to claim 1 wherein all EISCVSs of the first sub-set of EISCVSs originated from a single input stream of the at least one input stream.

17. A non-transitory computer readable medium that stores instructions for:
receiving at least one input video stream that comprises visual information obtained from multiple fields of view that differ from each other;
converting the at least one input video stream to a group of encoded independent self-contained video streams (EISCVSs), by performing a codec-agnostic process; wherein some EISCVSs comprise visual information from different spatial segments of the at least one input video stream; and wherein two or more EISCVSs comprise visual information from same spatial segments but are time shifted from each other by a time shift that is shorter than a duration of each one of the two or more EISCVSs;
receiving a first request to receive video information related to a first direction related to a first user;
generating a first video stream that comprises a first sub-set of EISCVSs that is related to the first direction; and
sending the first video stream to a device of the first user, over a first communication link that has a first bandwidth that is lower than a bandwidth required to convey the input video stream;
wherein the non-transitory computer readable medium also stores instructions for:
receiving or generating one or more viewing patterns of one or more users; and
determining a number of encoded independent self-contained video streams (EISCVSs) per the spatial segments of the at least one input video stream by (a) generating at least EISCVSs that are time shifted from each other and at least two other EISCVSs that differ from each other by resolution to a spatial segment that has a first popularity, and (b) generating a single EISCVS for another spatial segment that has a lower popularity than the first popularity.

18. The non-transitory computer readable medium according to claim 17 wherein the first direction is explicitly requested by the first user.

19. The non-transitory computer readable medium according to claim 17 that stores instructions for:

receiving a second request to receive video information related to a second direction related to a second user;

generating a second video stream that comprises a second sub-set of EISCVSs that is related to the second direction; and sending the second video stream to a device of the second user, over a second communication link that has a second bandwidth that is lower than a bandwidth required to convey the input video stream.

* * * * *